(12) United States Patent
Tan et al.

(10) Patent No.: US 11,455,548 B2
(45) Date of Patent: Sep. 27, 2022

(54) ACQUISITION METHOD FOR DOMAIN RULE KNOWLEDGE OF INDUSTRIAL PROCESS

(71) Applicant: INSTITUTE OF AUTOMATION, CHINESE ACADEMY OF SCIENCES, Beijing (CN)

(72) Inventors: Jie Tan, Beijing (CN); Chengbao Liu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/555,464

(22) Filed: Dec. 19, 2021

(65) Prior Publication Data

US 2022/0269955 A1 Aug. 25, 2022

(30) Foreign Application Priority Data

Feb. 18, 2021 (CN) .......................... 202110186773.3

(51) Int. Cl.
*G06N 5/02* (2006.01)
*G06F 17/18* (2006.01)
*G06N 5/04* (2006.01)

(52) U.S. Cl.
CPC ............. *G06N 5/025* (2013.01); *G06F 17/18* (2013.01); *G06N 5/045* (2013.01)

(58) Field of Classification Search
CPC ...... G06Q 10/063; G06Q 50/04; G06N 5/025; G06N 5/045; G06F 17/18
See application file for complete search history.

(56) References Cited

U.S. PATENT DOCUMENTS

2009/0187517 A1* 7/2009 Mihalkova ............ G06F 16/212
706/12
2016/0247090 A1* 8/2016 Yu ......................... G06F 40/295
(Continued)

FOREIGN PATENT DOCUMENTS

CN 110717052 A 1/2020
CN 110991186 A 4/2020
(Continued)

OTHER PUBLICATIONS

Dai et al., A Survey on Inductive Logic Programming, Journal of Computer Research and Development, pp. 138-154, vol. 56, Issue 1, dated Jun. 15, 2019.
(Continued)

*Primary Examiner* — Miranda M Huang
*Assistant Examiner* — Yao David Huang
(74) *Attorney, Agent, or Firm* — Westbridge IP LLC (57) ABSTRACT

Disclosed is an acquisition method for domain rule knowledge of an industrial process. The method comprises the steps of: establishing a domain rule base, establishing a semantic knowledge base, and combining the domain rule base and the semantic knowledge base so as to realize an augmented update of a domain rule knowledge base; describing the domain knowledge of the industrial process by using weighted first-order logic rules so as to form a training sample set of the first-order logic rules; performing a weight learning by applying probability soft logic and the training sample set of the first-order logic rules so as to realize weight to non-weighted rules; performing rule learning through a machine learning algorithm so as to obtain a first-order logic rule on a change in optimization decision-making semantic when multi-source data semantic information changes.

6 Claims, 2 Drawing Sheets

(56) References Cited

U.S. PATENT DOCUMENTS

2020/0134497 A1    4/2020  Salomon et al.
2020/0250557 A1*   8/2020  Kishimoto ............. G06N 5/025
2020/0357001 A1*  11/2020  Lopez Garcia .......... G06N 5/02

FOREIGN PATENT DOCUMENTS

CN    111026877 A    4/2020
CN    111126660 A    5/2020

OTHER PUBLICATIONS

First Office Action issued in counterpart Chinese Patent Application No. 202110186773.3, dated Mar. 29, 2021.
Liu et al., Path Planning and Intelligent Scheduling of Multi-AGV Systems in Workshop, Proceedings of the 36th Chinese Control Conference, pp. 2735-2739, Dalian, China, dated Jul. 28, 2017.

* cited by examiner

ACQUISITION METHOD FOR DOMAIN RULE KNOWLEDGE OF INDUSTRIAL PROCESS

CROSS-REFERENCE TO RELATED APPLICATIONS

The present disclosure claims the priority to the Chinese Patent Application CN202110186773.3 entitled "Acquisition method for domain rule knowledge of industrial process" filed on Feb. 18, 2021, the entire content of which is incorporated herein by reference.

FIELD OF THE INVENTION

The present disclosure relates to a field of artificial intelligence, and in particular, to an acquisition method for domain rule knowledge of an industrial process.

BACKGROUND OF THE INVENTION

There are various forms of unstructured domain knowledge, such as experience and knowledge accumulated by experts for a long time, mechanism knowledge of internal changes represented by differential equations or chemical equations, specification knowledge of different processes with tabular representation, and the like, of the industrial process, and some domain knowledge has uncertainty due to human cognitive bias. Hence, it is a foundation of realization of automation for optimization decision-making knowledge of the industrial process that such domain knowledge is acquired by selecting appropriate and unified expression mechanism. Further, the knowledge contained by the massive multi-source data of the industrial process richly expresses a dynamic variation law of optimization decision-making of the industrial process. By mining the knowledge contained by the multi-source data, establishing a semantic knowledge base of the industrial process, perform knowledge refining on the knowledge contained by the multi-source data by using machine learning technology to conclude the knowledge contained by the multi-source data into a few pieces of first-order logic rule knowledge that can be understood by human beings, the comprehensibility of an optimization decision-making model may be better enhanced.

The knowledge contained by the massive multi-source data of the industrial process richly expresses the dynamic variation law of optimization decision-making of the industrial process. By mining the knowledge contained by the multi-source data, establishing a semantic knowledge base of the industrial process, perform knowledge refining on the knowledge contained by the multi-source data by using machine learning technology to conclude the knowledge contained by the multi-source data into a few pieces of first-order logic rule knowledge that can be understood by human beings, the comprehensibility of an optimization decision-making model may be better enhanced. The purpose of refining the domain knowledge is to learn first-order logic rules from the semantic knowledge base so as to convert semantic knowledge of the multi-source data into rule knowledge with better interpretability. In machine learning, Rule Learning means that a set of rules that can be used for inference and judgment on unknown result data are learned from training data, and typical machine learning algorithm includes Decision Trees, and the like. In addition, Propositional Rule Learning and Inductive Logic Programming (ILP) are also typical method for knowledge refining. Specifically, since ILP is a learning method based on first-order logic representation which has stronger representation ability and can learn knowledge with more complex form from data, learning with ILP is harder.

In a patent with publication number of CN 110991186 A, an entity analysis problem is aimed to be solved. In solving the problem, predicate logic is used to represent entity attributes, entity relationships, and ontology constraints. Specifically, 2-ary or 3-ary predicates, such as Name (E, N), Property (E, P, V), Relation (E1, E2, R) and Mut (T1, T2), are used to represent entity attributes, entity relationships, and ontology constraints, and from this, logic rules of entity attributes, entity relationships, and ontology constraints are built. The corresponding weight learning is performed by using a probability soft logic method.

SUMMARY OF THE INVENTION

In order to solve the above technical problems or at least partially solve the above technical problems, the present disclosure provides an acquisition method for domain rule knowledge of an industrial process, the method including:
establishing a domain rule base, establishing a semantic knowledge base, and combining the domain rule base and the semantic knowledge base so as to realize an augmented update of a domain rule knowledge base;
the steps of establishing the domain rule base including:
performing representation and extraction of domain knowledge: describing the domain knowledge of the industrial process by using weighted first-order logic rules so as to form a training sample set of the first-order logic rules; and
performing construction of the domain rule base: performing a weight learning by applying probability soft logic and the training sample set of the first-order logic rules so as to realize weight to non-weighted rules;
the step of establishing the semantic knowledge base including: performing rule learning through a machine learning algorithm so as to obtain a first-order logic rule on a change in optimization decision-making semantics when multi-source data semantic information changes;
where a specific form of the weighted first-order logic rules is that if an N-ary predicate P represents that a property, state, or attribute of a certain industrial process target D is $D_S$ under a condition of $C_1, \ldots, C_n$, $P(D, C_1, \ldots, C_n, D_S)$ is an atom;
a relationship between a certain optimization decision-making problem and a series of causes of the optimization decision-making problem expressed by the weighted first-order logic rules is as follows:

$$\forall D_1, D_2, \ldots, D_l, R \cdot P_1(D_1, \ldots) \wedge P_2(D_2, \ldots) \wedge \ldots \wedge P_l(D_l, \ldots) \Rightarrow P_R(Q, R): \lambda,$$

and the rule indicates that the states of industrial process targets $D_1, D_2, \ldots D_l$ in a certain condition cause the optimization decision-making problem Q resulting in R;
where $P_1, P_2, \ldots, P_l, P_R$ are predicates; $D_1, D_2, \ldots, D_l$, R are variables; l represents a total number of predicate logical representations on the industrial process targets in one rule; and λ represents a weight;
a specific form of the semantic knowledge is $k=(H_1, H_2, \ldots, H_N):\{A_1, A_2, \ldots, A_N\}$: R, wherein a specific from of R is $\{R_1, R_2, \ldots, R_N\}$; $H_N$ is an n-th compact characteristic of an n-th multi-source data $X_N$; $A_i$ is semantic information of an n-th multi-source data $X_N$; in the case that different multi-source data corresponds to different semantic information changes, a variation law of the optimization decision-making semantics $R_N$ is implied; by mining a variation law between the semantic information and the optimization decision-making semantics of the different multi-source data from the semantic knowledge base, the first-order logic rule may be extracted from the semantic information of the multi-source data;

a specific step of performing rule learning through the machine learning algorithm so as to obtain a first-order logic rule on a change in the optimization decision-making semantics when multi-source data semantic information changes is:

defining an logic predicate $P_i(H_i, c_{A_i}^{ij})$ to represent that characteristic semantics corresponding to an i-th compact characteristic of the multi-source data is $c_{A_i}^{ij}$ such that the first-order logic rule on the change in the optimization decision-making semantics when multi-source data semantic information changes may be obtained by performing the rule learning through the machine learning algorithm, $$P_1(H_1, c_{A_1}^{ij}) \wedge \ldots \wedge P_N(H_N, c_{A_N}^{Nj}) \Rightarrow P_R(c_R^s):\hat{\lambda}, \text{ and}$$

the rule indicates that a result of the optimization decision-making problem after the compact characteristics $H_1, H_2, \ldots, H_N$ of the multi-source data being subject to the rule learning by using the machine learning algorithm is $c_R^s$, where $P_R(c_R^s)$ represents the logic predicate of the optimization decision-making semantics, and $\hat{\lambda}$ represents a corresponding weight.

According to an embodiment of the present disclosure, the weight indicates an importance of the first-order logic rule, i.e., the larger the weight, the more important the first-order logic rule is, and a specific value of the weight is a non-negative real number.

According to an embodiment of the present disclosure, the domain rule knowledge base is defined as:

$$K_R = \{(r_i, \lambda_i)\}_{i=1}^m,$$

where in represents a size of the domain rule knowledge base, $r_i$ represents an i-th first-order logic rule, and $\lambda_i$ is a weight of a corresponding first-order logic rule.

According to an embodiment of the present disclosure, a model of the probability soft logic defines a probability distribution to enable as more atomic explanations to satisfy all of the first-order logic rules as possible, and the probability distribution thereof is as follows:

$$P(I) = \frac{1}{Z}\exp\left[-\sum_{r \in K_R} \lambda_r(d(r))^P\right]$$

$$Z = \int_I \exp\left[-\sum_{r \in K_R} \lambda_r(d(r))^P\right],$$

where $\lambda_r$ represents a weight value of a first-order logic rule r; Z is a planning factor for Markov Random Field; $P \in \{1, 2\}$ represents that 2 types of loss functions are provided, and when P=1, a linear loss function, which means a size of a distance between satisfying one first-order logic rule and violating the one first-order logic rule, is adopted, and when P=2, a square loss function, which means that all rules are satisfied to some degree, which generally have truth values far away from extreme values, is adopted; and d(r) represents a distance satisfaction of the first-order logic rule r.

According to an embodiment of the present disclosure, the probability soft logic defines the distance satisfaction to evaluate a probability of a logic rule being satisfied:

$$d(r) = \max\{0, I(r_{body}) - I(r_{head})\}; \text{ and}$$

in the model of the probability soft logic, a value of an atomic probability of the first-order logic rules adopts a soft truth-value, i.e., continuous values between [0,1]; the first-order logic rule r is equivalently expressed as $r_{body} \rightarrow r_{head}$, i.e., a rule body infers a rule head; $I(r_{body})$ is a probability of the rule body being established; and $I(r_{head})$ is a probability of the rule head being established.

According to an embodiment of the present disclosure, the step of the weight learning is as follows: using the training sample set of the first-order logic rules and non-weighted first-order logic rules as inputs; and calculating a best weight for each of the rules by means of Maximum likelihood estimate; and a maximum likelihood function of the Maximum likelihood estimate is:

$$f(I; \lambda_{r_i}) = \prod_{i=1}^n \frac{1}{\int_I \exp\left[-\sum_{r_i \in K_R} \lambda_{r_i}(d(r_i))^P\right]} * \exp\left[-\sum_{r_i \in K_R} \lambda_{r_i}(d(r_i))^P\right],$$

and by solving the above equation, a maximum likelihood estimator of $\lambda_r$ is obtained, such that a probability density distribution P*(I) of a known first-order logic rule base is obtained as shown by the following equation:

$$P^*(I) = \frac{1}{Z}\exp\left[-\sum_{r \in K_R} \lambda_r(d(r))^P\right]$$

$$Z = \int_I \exp\left[-\sum_{r \in K_R} \lambda_r(d(r))^P\right],$$

and a weight of unknown first-order logic rule may be obtained by means of the probability density distribution P*(I).

The above technical solutions provided by the embodiment of the present disclosure have following advantages over the prior art.

In the method provided by the embodiment of the present disclosure, firstly, for the purpose of providing a basic support to the optimization decision-making problems such as product quality inspection and fault diagnosis of the industrial process, the acquisition of the domain rules is performed on the domain knowledge of the industrial process, thereby facilitating intelligent construction of enterprises.

Secondly, properties, states, attributes and the correlation therebetween of different production factors in a manufacturing process are expressed by using an N-ary predicate, so as to realize representation of the unstructured domain knowledge, such as expert experience, mechanism knowledge and process specification, of the industrial process and enable such representation to be more flexible.

Then, in the method, formulas $\forall D_1, D_2, \ldots, D_l, R \cdot P_1(D_1, \ldots) \wedge P_2(D_2, \ldots) \wedge \ldots \wedge P_l(D_l, \ldots) \Rightarrow P_R(Q,R):\lambda$ and $K_R = \{(r_i, \lambda_i)\}_{i=1}^m$ are provided to express the domain knowledge of the industrial process, so as to provide a feasible solution for effectively using the unstructured domain knowledge, such as the expert experience, the mechanism knowledge and the process specification of the industrial process accumulated by enterprises.

BRIEF DESCRIPTION OF THE DRAWINGS

The accompanying drawings herein, which are incorporated in and constitute a part of this specification, illustrate embodiments according to the present disclosure and together with the specification serve to explain the inventive principles.

For the purpose of more clearly illustrating the embodiments of the present disclosure or the technical solution in the prior art, a brief description of the accompanying drawings to be used in describing the embodiments or the prior art is given below. It is obvious for ordinary persons skilled in the art to obtain other accompanying drawings from these accompanying drawings without any inventive effort.

DETAILED DESCRIPTION OF THE EMBODIMENTS

For the purpose of making the objects, technical solutions and advantages of the present disclosure clearer, the technical solutions in the embodiments of the present disclosure will be described clearly and completely below in conjunction with the accompanying drawings of embodiment of the present disclosure. Obviously, the described embodiments are a part of the embodiments of the present disclosure, and not all of the embodiments of the present disclosure. Based on the embodiments of the present disclosure, all other embodiments obtained by ordinary persons skilled in the art without inventive work fall within the protective scope of the present disclosure.

First Embodiment

The present disclosure provides an acquisition method for domain rule knowledge of an industrial process, and the method comprises:
establishing a domain rule base, establishing a semantic knowledge base, and combining the domain rule base and the semantic knowledge base so as to realize an augmented update of a domain rule knowledge base;
the step of establishing the domain rule base including:
performing representation and extraction of domain knowledge: describing the domain knowledge of the industrial process by using weighted first-order logic rules so as to form a training sample set of the first-order logic rules; and
performing construction of the domain rule knowledge base: performing a weight learning by applying probability soft logic and the training sample set of the first-order logic rules so as to realize weight to non-weighted rules;
the step of establishing the semantic knowledge base including: performing rule learning through a machine learning algorithm so as to obtain a first-order logic rule on a change in optimization decision-making semantics when multi-source data semantic information changes.

Further, based on the above solution, a specific form of the weighted first-order logic rules is that if an N-ary predicate P represents that a property, state, or attribute of a certain industrial process target D is $D_S$ under a condition of $P(D, C_1, \ldots, C_n, D_s)$ is an atom.

Further, based on the above solution, a relationship between a certain optimization decision-making problem and a series of causes of the optimization decision-making problem expressed by the weighted first-order logic rules is as follows:

$$\forall D_1, D_2, \ldots, D_l, R \cdot P_1(D_1, \ldots) \wedge P_2(D_2, \ldots) \wedge \ldots \wedge P_l(D_l, \ldots) \Rightarrow P_R(Q, R):\lambda,$$

and the rule indicates that the states of industrial process targets $D_1, D_2, \ldots D_l$ in a certain condition cause the optimization decision-making problem Q resulting in R;

where $P_1, P_2, \ldots, P_l, P_R$ are predicates; $D_1, D_2, \ldots, D_l$, R are variables; l represents a total number of predicate logical representations on the industrial process targets in one rule; and $\lambda$ represents a weight;

Further, based on the above solution, the weight indicates an importance of the first-order logic rule, i.e., the larger the weight, the more important the first-order logic rule is, and a specific value of the weight is a non-negative real number.

According to an embodiment of the present disclosure, the domain rule knowledge base is defined as:

$$K_R = \{(r_i, \lambda_i)\}_{i=1}^m,$$

where m represents a size of the domain rule knowledge base, $r_i$ represents an i-th first-order logic rule, and $\lambda_i$ is a weight of a corresponding first-order logic rule.

Further, based on the above solution, a model of the probability soft logic defines a probability distribution to enable as more atomic explanations to satisfy all of the first-order logic rules as possible, and the probability distribution thereof is as follows:

$$P^*(I) = \frac{1}{Z}\exp\left[-\sum_{r \in K_R} \lambda_r (d(r))^p\right]$$

$$Z = \int_I \exp\left[-\sum_{r \in K_R} \lambda_r (d(r))^p\right],$$

where $\lambda_r$ represents a weight value of a first-order logic rule r; Z is a planning factor for Markov Random Field; $P \in \{1, 2\}$ represents that 2 types of loss functions are provided, and when P=1, a linear loss function, which means a size of a distance between satisfying one first-order logic rule and violating the one first-order logic rule, is adopted, and when P=2, a square loss function, which means that all rules are satisfied to some degree, which generally have truth values far away from extreme values, is adopted; and d(r) represents a distance satisfaction of the first-order logic rule r.

Further, based on the above solution, the probability soft logic defines the distance satisfaction to evaluate a probability of a logic rule being satisfied:

$$d(r) = \max\{0, I(r_{body}) - I(r_{head})\}; \text{ and}$$

in the model of the probability soft logic, a value of an atomic probability of the first-order logic rules adopts a soft truth-value, i.e., continuous values between [0-1]; the first-order logic rule r is equivalently expressed as $r_{body} \rightarrow r_{head}$, i.e., a rule body infers a rule head; $I(r_{body})$ is a probability of the rule body being established; and $I(r_{head})$ is a probability of the rule head being established.

According to an embodiment of the present disclosure, the step of the weight learning is as follows: using the training sample set of the first-order logic rules and non-weighted first-order logic rules as inputs; and calculating a best weight for each of the rules by means of Maximum likelihood estimate; and a maximum likelihood function of the Maximum likelihood estimate is:

$$f(I; \lambda_{r_i}) = \prod_{i=1}^{n} \frac{1}{\int_I \exp\left[-\sum_{r_i \in K_R} \lambda_{r_i}(d(r_i))^p\right]} * \exp\left[-\sum_{r_i \in K_R} \lambda_{r_i}(d(r_i))^p\right],$$

and by solving the above equation, a maximum likelihood estimator of $\lambda_r$ is obtained, such that a probability density distribution $P^*(I)$ of a known first-order logic rule base is obtained as shown by the following equation:

$$P^*(I) = \frac{1}{Z}\exp\left[-\sum_{r \in K_R} \lambda_r(d(r))^p\right]$$

$$Z = \int_I \exp\left[-\sum_{r \in K_R} \lambda_r(d(r))^p\right],$$

and a weight of unknown first-order logic rule may be obtained by means of the probability density distribution $P^*(I)$.

Further, based on the above solution, a specific form of the semantic knowledge is $$k = (H_1, H_2, \ldots, H_N):\{A_1, A_2, \ldots, A_N\}:R,$$

where a specific from of R is $\{R_1, R_2, \ldots, R_N\}$; $H_N$ is an n-th compact characteristic of an n-th multi-source data $X_N$; $A_i$ is semantic information of an n-th multi-source data $X_N$; in the case that different multi-source data corresponds to different semantic information changes, a variation law of the optimization decision-making semantics $R_N$ is implied; by mining a variation law between the semantic information and the optimization decision-making semantics of the different multi-source data from the semantic knowledge base, the first-order logic rule may be extracted from the semantic information of the multi-source data.

Further, based on the above solution, a specific step of performing rule learning through the machine learning algorithm so as to obtain a first-order logic rule on a change in the optimization decision-making semantics when multi-source data semantic information changes is: defining an logic predicate $P_i(H_i, c_{A_i}^{ij})$ to represent that characteristic semantics corresponding to an i-th compact characteristic $H_i$ of the multi-source data is $c_{A_i}^{ij}$ such that the first-order logic rule on the change in the optimization decision-making semantics when the multi-source data semantic information changes may be obtained by performing the rule learning through the machine learning algorithm, $$P_1(H_1, c_{A_1}^{ij}) \wedge \ldots \wedge P_N(H_N, c_{A_N}^{Nj}) \Rightarrow P_R(c_R^s):\hat{\lambda}$$

the rule indicates that a result of the optimization decision-making problem after the compact characteristics $H_1, H_2, \ldots, H_N$ of the multi-source data being subject to the rule learning by using the machine learning algorithm is $c_R^s$, where $P_R(c_R^s)$ represents the logic predicate of the optimization decision-making semantics, and $\hat{\lambda}$ represents a corresponding weight.

In the method provided by the embodiment of the present disclosure, firstly, for the purpose of providing a basic support to the optimization decision-making problems such as product quality inspection and fault diagnosis of the industrial process, the acquisition of the domain rules is performed on the domain knowledge of the industrial process, thereby facilitating intelligent construction of enterprises.

Secondly, properties, states, attributes and the correlation therebetween of different production factors in a manufacturing process are expressed by using an N-ary predicate, so as to realize representation of the unstructured domain knowledge, such as expert experience, mechanism knowledge and process specification, of the industrial process and enable such representation to be more flexible.

Then, in the method, formulas $\forall D_1, D_2, \ldots, D_I, R \cdot P_1(D_1, \ldots) \wedge P_2(D_2, \ldots) \wedge \ldots \wedge P_I(D_I, \ldots) \Rightarrow P_R(Q,R):\lambda$ and $K_R = \{(r_i, \lambda_i)\}_{i=1}^{m}$ are provided to express the domain knowledge of the industrial process, so as to provide a feasible solution for effectively using the unstructured domain knowledge, such as the expert experience, the mechanism knowledge and the process specification of the industrial process accumulated by enterprises.

Second Embodiment

Figure 1:
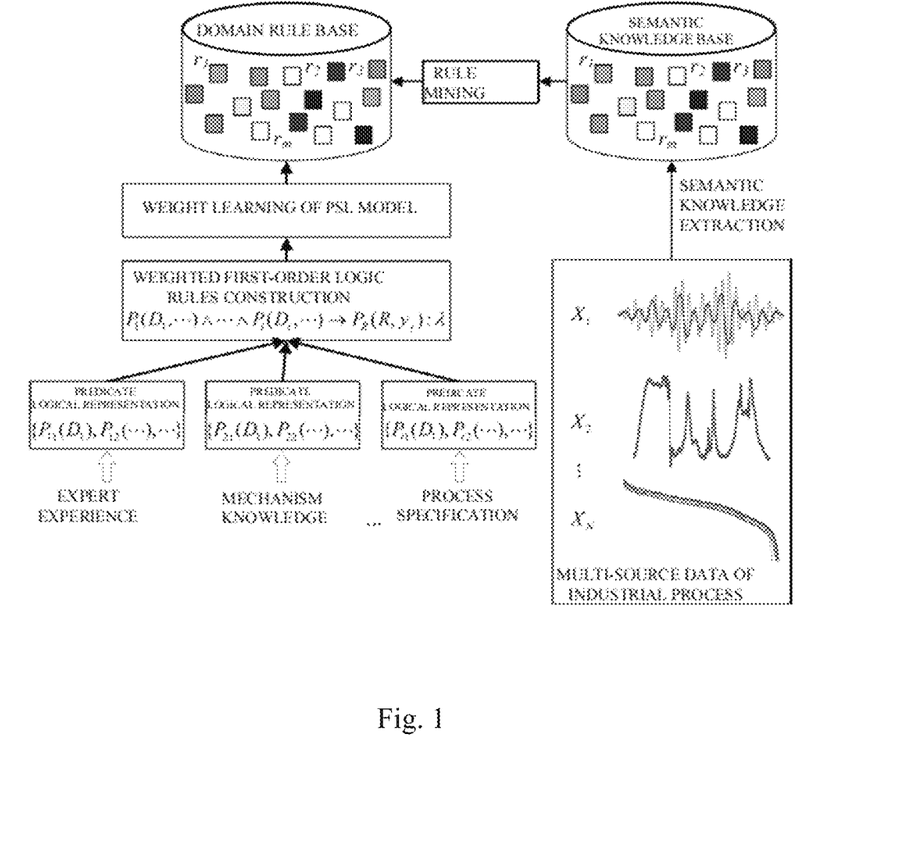
FIG. 1 is a flow diagram of an acquisition method for domain rule knowledge of an industrial process provided by the embodiments of the present disclosure.

FIG. 1 is the acquisition method for the domain rule knowledge of the industrial process provided by the embodiments of the present disclosure, and the method includes:

establishing a domain rule base, establishing a semantic knowledge base, and combining the domain rule base and the semantic knowledge base so as to realize an augmented update of a domain rule knowledge base.

The step of establishing the domain rule base includes:

performing representation and extraction of domain knowledge: describing the domain knowledge of the industrial process by using weighted first-order logic rules so as to form a training sample set of the first-order logic rules; and constructing a first-order logic rule by using the weighted first-order logic rules to describe the domain knowledge of the industrial process and using an N-ary predicate to express properties, states, attributes and the correlation therebetween of different production factors in a manufacturing process, so as to realize representation of the unstructured domain knowledge, such as the expert experience, the mechanism knowledge and the process specification, of the industrial process. The N-ary predicate may be defined based on actual needs. If the N-ary predicate P is defined to represent that a property, state, or attribute of a certain industrial process target D is $D_S$ under a condition of $C_1, \ldots, C_n$, $P(D, C_1, \ldots, C_n, D_s)$ is an atom. When parameters in P are specific values (e.g., $P(cell_1, 0, 6, -2)$), it is referred to as a basic atom. Generally, the optimization decision-making problems such as product quality inspection and fault diagnosis of the industrial process are problems of cause-and-inference, and a relationship between a certain optimization decision-making problem and a series of causes of the optimization decision-making problem expressed by the weighted first-order logic rules is as follows:

$$\forall D_1, D_2, \ldots, D_l, R \cdot P_1(D_1, \ldots) \wedge P_2(D_2, \ldots) \wedge \ldots \wedge P_l(D_l, \ldots) \Rightarrow P_R(Q,R):\lambda.$$

The rule indicates that the states of industrial process targets $D_1, D_2, \ldots D_l$ in a certain condition cause the optimization decision-making problem Q resulting in R. In the formula, $P_1, P_2, \ldots, P_l, P_R$ are predicates; $D_1, D_2, \ldots, D_l$, R are variables; l represents a total number of predicate logical representations on the industrial process targets in one rule; and $\lambda$ represents a weight. The weight indicates an importance of the first-order logic rule, i.e., the larger the weight, the more important the first-order logic rule is, and a specific value of the weight is a non-negative real number.

Through such representations, the unstructured domain knowledge, such as expert experience, mechanism knowledge and process specification, of the industrial process may be extracted so as to provide a basic support to the optimization decision-making problems such as product quality inspection and fault diagnosis.

The step of establishing the domain rule base further includes:

performing construction of the domain rule knowledge base: performing a weight learning by applying probability soft logic and the training sample set of the first-order logic rules so as to realize weight to non-weighted rules.

The domain rule knowledge base is defined as:

$$K_R = \{(r_i, \lambda_i)\}_{i=1}^m,$$

where m represents a size of the domain rule knowledge base, $r_i$ represents an i-th first-order logic rule, and $\lambda_i$ is a weight of a corresponding first-order logic rule. Generally, first-order logic rule knowledge extracted from the domain knowledge of the industrial process is required to be subject to the weight learning, and hence, there is a need to construct the model of the probability soft logic based on experience and knowledge. The model of the probability soft logic defines one probability distribution to enable as more atomic explanations to satisfy all of the first-order logic rules as possible, and the probability distribution thereof is as follows:

$$P^*(I) = \frac{1}{Z} \exp\left[-\sum_{r \in K_R} \lambda_r (d(r))^P\right]$$

$$Z = \int_I \exp\left[-\sum_{r \in K_R} \lambda_r (d(r))^P\right]$$

where $\lambda_r$ represents a weight value of a first-order logic rule r; Z is a planning factor for Markov Random Field; $P \in \{1,2\}$ represents that 2 types of loss functions are provided, and when P=1, a linear loss function, which means a size of a distance between satisfying one first-order logic rule and violating the one first-order logic rule, is adopted, and when P=2, a square loss function, which means that all rules are satisfied to some degree, which generally have truth values far away from extreme values, is adopted; and d(r) represents a distance satisfaction of the first-order logic rule r. The distance satisfaction is a probability of one first-order logic rule in the model of the probability soft logic being satisfied, and compared with a known probability graph model (e.g., Markov logic network which adopts boolean values of {0,1} as a probability value of the first-order logic rule being satisfied), the value of the distance satisfaction adopts continuous values between [0,1]. The distance satisfaction of the first-order logic rule is calculated and $\wedge$ (conjunction), $\vee$ (disjunction), $-$ (negation) of Lukasiewicz are used as logical connectives, which are shown as follows:

$$I(l_1 \wedge l_2) = \max\{0, I(l_1) + I(l_2) - 1\}$$

$$I(l_1 \vee l_2) = \min\{1, I(l_1) + I(l_2)\}$$

$$I(\neg l_1) = 1 - I(l_1)$$

The probability soft logic defines the distance satisfaction to evaluate a probability of a logic rule being satisfied:

$$d(r) = \max\{0, I(r_{body}) - I(r_{head})\}, \text{ and}$$

in the model of the probability soft logic, a value of an atomic probability of the first-order logic rules adopts a soft truth-value, i.e., continuous values between [0,1]; the first-order logic rule r is equivalently expressed as $r_{body} \rightarrow r_{head}$, i.e., a rule body infers a rule head; $I(r_{body})$ is a probability of the rule body being established; and $I(r_{head})$ is a probability of the rule head being established.

The step of the weight learning is: using the training sample set of the first-order logic rules and non-weighted first-order logic rules as inputs; and calculating a best weight for each of the rules by means of Maximum likelihood estimate. A maximum likelihood function of the Maximum likelihood estimate is:

$$f(I; \lambda_{r_i}) = \prod_{i=1}^n \frac{1}{\int_I \exp\left[-\sum_{r_i \in K_R} \lambda_{r_i} (d(r_i))^P\right]} * \exp\left[-\sum_{r_i \in K_R} \lambda_{r_i} (d(r_i))^P\right],$$

and by solving the above equation, a maximum likelihood estimator of $\lambda_r$ is obtained, such that a probability density distribution P*(I) of a known first-order logic rule base is obtained as shown by the following equation:

$$P^*(I) = \frac{1}{Z} \exp\left[-\sum_{r \in K_R} \lambda_r (d(r))^P\right]$$

$$Z = \int_I \exp\left[-\sum_{r \in K_R} \lambda_r (d(r))^P\right],$$

and a weight of unknown first-order logic rule may be obtained by means of the probability density distribution P*(I).

Figure 2:
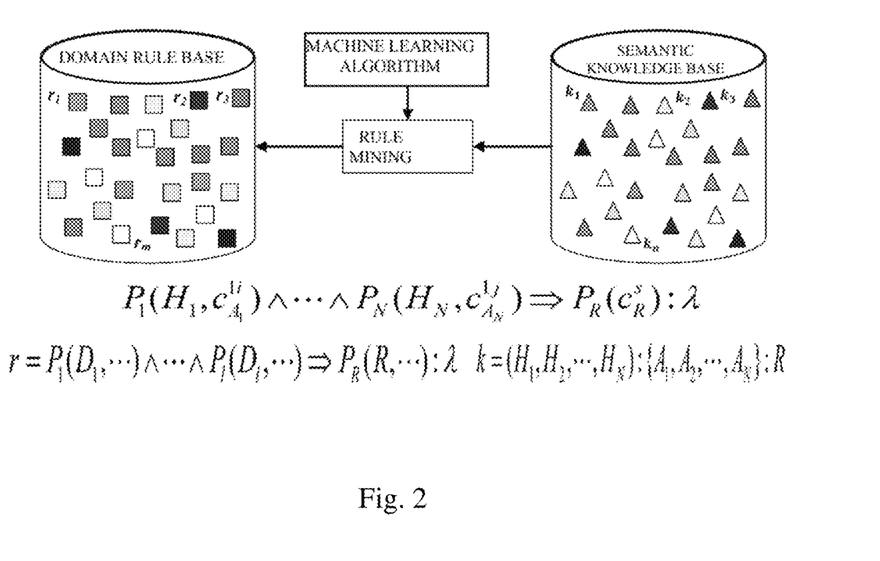
FIG. 2 a schematic diagram illustrating a combination of a semantic knowledge base with an original domain rule knowledge base through machine learning according to an exemplary embodiment.

As shown in FIG. 2, the step of establishing the semantic knowledge base includes: performing rule learning through a machine learning algorithm so as to obtain a first-order logic rule on a change in optimization decision-making semantics when multi-source data semantic information changes.

A specific form of the semantic knowledge is k=($H_1$, $H_2$, ..., $H_N$): {$A_1$, $A_2$, ..., $A_N$}:R, where a specific from of R is {$R_1$, $R_2$, ..., $R_N$}; $H_N$ is an n-th compact characteristic of an n-th multi-source data $X_N$; $A_i$ is semantic information of an n-th multi-source data $X_N$; in the case that different multi-source data corresponds to different semantic information changes, a variation law of the optimization decision-making semantics $R_N$ is implied; by mining a variation law between the semantic information and the optimization decision-making semantics of the different multi-source data from the semantic knowledge base, the first-order logic rule may be extracted from the semantic information of the multi-source data.

A specific step of performing the rule learning through a machine learning algorithm so as to obtain a first-order logic rule on a change in optimization decision-making semantics when multi-source data semantic information changes is: defining an logic predicate $P_i(H_i, c_{A_i}^{ij})$ to represent that characteristic semantics corresponding to an i-th compact characteristic of the multi-source data is $c_{A_i}^{ij}$ such that the first-order logic rule on the change in the optimization decision-making semantics when the multi-source data semantic information changes may be obtained by performing the rule learning through the machine learning algorithm such as decision tree, propositional rule learning, inductive logic programming, $$P_1(H_1, c_{A_1}^{ij}) \wedge \ldots \wedge P_N(H_N, c_{A_N}^{Nj}) \Rightarrow P_R(c_R^s):\hat{\lambda}, \text{ and}$$

the rule indicates that a result of the optimization decision-making problem after the compact characteristics $H_1, H_2, \ldots H_N$ of the multi-source data being subject to the rule learning by using the machine learning algorithm is $c_R^s$, where $P_R(c_R^s)$ represents the logic predicate of the optimization decision-making semantics, and $\hat{\lambda}$ represents a corresponding weight.

The first-order logic rules may be extracted from the semantic knowledge base of the industrial process in this way. It is assumed that a set of the first-order logic rules extracted from the semantic knowledge base of the industrial process is shown as follows:

$$K_{R_S} = \{\hat{r}_i : \hat{\lambda}_i\}_{i=1}^{m_s}$$

where $\hat{r}_i = P_1(H_1, c_{A_1}^{1i}) \wedge \ldots \wedge P_N(H_N, c_{A_N}^{Nj}) \Rightarrow P_R(c_R^s)$ is the obtained first-order logic rules, and $m_s$ represents a total number of the obtained rules. Accordingly, an augmented update of the domain rule knowledge base is realized by combining the newly obtained set of the first-order logic rules with the original domain rule knowledge base $K_R$. The augmented rule knowledge base is shown as follows:

$$K^*_R = K_R \cup K_{R_S}.$$

Third Embodiment

Construction of a domain rule knowledge base on quality inspection of a lithium-ion battery.

A power battery PACK of a new energy vehicle is generally assembled by thousands of single lithium-ion batteries connected in series, parallel or series and parallel, thereby increasing a capacity and a voltage of the power battery PACK and increasing a mileage of the new energy vehicle. Hence, a consistency of the single lithium-ion batteries in power battery PACK is particularly important. Generally, an initial performance of the single lithium-ion battery may be reflected by a charge-discharge voltage curve and internal resistance in a formation process, and the initial performance of the single lithium-ion battery may be better determined by extracting domain rules on these information and establishing a domain rule knowledge base of the quality inspection of the lithium-ion battery, thereby selecting the single lithium-ion batteries with consistent performance to assemble the power battery PACK.

(1) Acquisition and Representation of Domain Rules of the Quality Inspection of the Lithium-Ion Battery As can be known from process knowledge of the lithium-ion battery and expert knowledge of a formation technologist, the discharge voltage curve of the lithium-ion battery decreases rapidly in the first 6 minutes and the last 6 minutes, and the middle stage is flat. The smoother the middle stage, the better the discharge performance of the lithium-ion battery. Further, under a specific capacity, the performance of lithium-ion battery is relatively stable when the internal resistance thereof is between 25~55 mΩ with the steady-state voltage being between 3.86~3.88V. The above unstructured domain knowledge is converted into weighted first-order logic rules.

A quaternion predicate DischargeCurve($Cell_{No}$, $Time_{lower}$, $Time_{upper}$, $Slope_{average}$) is defined to represent an average change of a slope of the discharge voltage curve in the formation process of the lithium-ion battery; a binary predicate DischargePerformance($Cell_{No.}$, Good) is defined to represent that the discharge performance of the lithium-ion battery is good; a binary predicate Resistance($Cell_{No.}$, Value) is defined to represent an internal resistance of the lithium-ion battery; a binary predicate StableVotage($Cell_{No.}$, Value) is defined to represent a stable voltage of the lithium-ion battery; a binary predicate Capacity($Cell_{No.}$, Value) is defined to represent a capacity of the lithium-ion battery; and a binary predicate Consitency($Cell_1$, Good) is defined to represent that consistency of the lithium-ion batteries is good.

The knowledge of the weighted first-order logic rule for defining the discharge voltage curve of the lithium-ion battery is DischargeCurve($Cell_1$,0,6,value)$\wedge$DischargeCurve
($Cell_1$,6,60,value)$\wedge$ DischargeCurve($Cell_1$,60,66,value)$\Rightarrow$DischargePerformance($Cell_1$,Good):$\lambda_{DC}$.

Specifically, the knowledge of more weighted first-order logic rules may be obtained according to the formation process curve of the lithium-ion battery, for example, DischargeCurve($Cell_1$,0,6,−0.05)$\wedge$DischargeCurve
($Cell_1$,6,60,−3.7×10$^{-4}$)$\wedge$ DischargeCurve($Cell_1$,60,66,−0.185)$\Rightarrow$DischargePerformance($Cell_1$,Good):0.9, and DischargeCurve($Cell_1$,0,6,−0.05)$\wedge$DischargeCurve
($Cell_1$,6,60,−5.4×10$^{-1}$)$\wedge$ DischargeCurve($Cell_1$,60,66,−0.185)$\Rightarrow$DischargePerformance($Cell_1$,Good):0.2.

(2) Construction of a Domain Rule Knowledge Base of the Quality Inspection of the Lithium-Ion Battery The domain rule knowledge base of the quality inspection of the lithium-ion battery is defined by the equation $K_{R\text{-}lithium\text{-}ion} = \{(r_i, \lambda_i)\}_{i=1}^m$.

Known knowledge are given as follows:

$I(\text{DischargeCurve}(Cell_i,0,6,−0.04))=0.9$ $I(\text{DischargeCurve}(Cell_i,6,60,−0.008))=0.82$ $I(\text{Discharge Curve}(Cell_i,60,66,−0.2))=0.88$ $I(DischargePerformance(Cell_i,Good))=0.6$ $I(Resistence(Cell_i,30))=0.69$ $I(StableVotage(Cell_i,3.88))=0.96$ $I(Capacity(Cell_i,2000))=0.92$, and $I(Consitency(Cell_i,Good))=0.4$ It is assumed that there are 2 rules with unknown weights: $\{r_s:\lambda_s\}$ and $\{r_t:\lambda_t\}$, wherein, $r_s$ is DischargeCurve($Cell_i$,0,6,−0.04)/\DischargeCurve($Cell_i$,6,60,−0.008)/\

DischargeCurve($Cell_i$,60,66,−0.2)⇒DischargePerformance($Cell_i$,Good), and $r_t$ is DischargePerformance($Cell_i$,Good)/\Resistence($Cell_i$,30)/\

StableVotage($Cell_i$,3.88)/\Capacity($Cell_i$,2000)⇒Consitency($Cell_i$,Good).

According to formula $I(l_1 \wedge l_2) = \max\{0, I(l_1)+I(l_2)-1\}$ $I(l_1 \vee l_2) = \min\{1, I(l_1)+I(l_2)\}$ $I(\neg l_1) = 1 - I(l_1)$ and formula $d(r) = \max\{0, I(r_{body}) - I(r_{head})\}$, the following results may be obtained:

$I$(DischargeCurve($Cell_i$,0,6,−0.04)/\DischargeCurve($Cell_i$,6,60,−0.008))=

$\max\{0, 0.9+0.82-1\} = 0.72$, $I$(DischargeCurve($Cell_i$,0,6,−0.04)/\DischargeCurve($Cell_i$,6,60,−0.008)/\

DischargeCurve($Cell_i$,60,66,−0.2))=$\max\{0, 0.72+0.88-1\}=0.84$, $d(r_s) = \max\{0, 0.84-0.6\} = 0.24$, $I$(DischargePerformance($Cell_i$,Good)/\Resistence($Cell_i$,30))=

$\max\{0, 0.6+0.69-1\} = 0.29$, $I$(DischargePerformance($Cell_i$,Good)/\Resistence($Cell_i$,30)/\

StableVotage($Cell_i$,3.88))=$\max\{0, 0.29+0.96-1\}=0.25$, $I$(DischargePerformance($Cell_i$,Good)/\Resistence($Cell_i$,30)/\

StableVotage($Cell_i$,0.88)/\Capacity($Cell_i$,2000))=

$\max\{0, 0.25+0.92-1\} = 0.17$, and $d(r_t) = \max\{0, 0.17-0.4\} = 0$

The formulas $$P^*(I) = \frac{1}{Z}\exp\left[-\sum_{r \in K_R}\lambda_r(d(r))^p\right]$$

and $$Z = \int_I \exp\left[-\sum_{r \in K_R}\lambda_r(d(r))^p\right]$$

are established based on known knowledge.

With the probability density distribution P(I) of the shown domain rule knowledge, a maximum likelihood estimator of $\lambda_r$ of the weight is obtained by using the probability soft logic technology and according to the formula $$f(I;\lambda_{r_i}) = \prod_{i=1}^{n} \frac{1}{\int_I \exp\left[-\sum_{r_i \in K_R}\lambda_{r_i}(d(r_i))^p\right]} * \exp\left[-\sum_{r_i \in K_R}\lambda_{r_i}(d(r_i))^p\right],$$

thereby obtaining the weights of the first-order logic rule $r_s$ and $r_t$ by using the probability density distribution $P^*(I)$, such that the domain rule base $K_{R\text{-}lithium\text{-}ion}$ of the quality inspection of the lithium ion battery is constructed extendedly.

(3) Refining of the Domain Knowledge of the Quality Inspection of the Lithium Ion Battery Driven by Decision Tree The CVC curve, CCC curve and DVC curve of 4822 single cells are given as samples. Among these samples, there are 822 abnormal samples, such that the semantic knowledge base of the quality inspection of the lithium ion battery is $K=\{k_i\}_{i=1}^{4822}$, where $k_i=(H_{CVC}^i, H_{CCC}^i, H_{DCV}^i)$: $\{A_{CVC}^i, A_{CCC}^i, A_{DVC}^i\}$: $R_i$ is an i-th knowledge element, and $R_i \in C_R$ is decision-making semantics of the i-th knowledge element.

The domain rules are obtained by rule mining on the semantic knowledge base $K=\{k_i\}_{i=1}^{4822}$ of the quality inspection of the lithium ion battery by using the decision tree algorithm, where an i-th domain rule obtained may be expressed as $P_{CVC}(H_{CVC}^i, c_{A_{CVC}}^{1i}) \wedge P_{CCC}(H_{CCC}^i, c_{A_{CCC}}^{1i}) \wedge P_{DVC}(H_{DVC}^i, c_{A_{DVC}}^{1i}) \Rightarrow P_R(c_R^{si}):\hat{\lambda}_i$.

The set of the first-order logic rules $K_{R_S\text{-}lithium\text{-}ion}=\{\hat{r}_i:\hat{\lambda}_i\}_{i=1}^{m_s}$ extracted from the semantic knowledge base of the quality inspection of the lithium ion battery is thus formed, where $m_s$ is less than 4822. Then, an augmented constructed domain rule knowledge base $K^*_{R\text{-}litium\text{-}ion} = K_{R\text{-}lithium\text{-}ion} \cup K_{R_S\text{-}lithium\text{-}ion}$ of the quality inspection of the lithium ion battery is formed by combining the newly obtained set of the first-order logic rules with the original domain rule knowledge base $K_{R\text{-}lithium\text{-}ion}$.

In the present disclosure, it should be noted that relational terms such as "first" and "second" are only used to distinguish one entity or operation from another entity or operation, and do not necessarily require or imply any such actual correlation or sequence between these entities or operations. Further, terms "include," "comprise" or any other variation thereof are intended to cover non-exclusive inclusion, such that a process, method, article, or device that includes a series of elements includes not only those elements, but also other elements that are not explicitly listed, or elements inherent for such process, method, article, or device. Without further limitations, the elements defined by the statement "including a . . . " do not exclude the existence of other same elements in the process, method, article or device including the elements.

The above is only the specific embodiments of the present disclosure, which enables persons skilled in the art to understand or realize the present disclosure. Various modifications to these embodiments will be apparent to persons skilled in the art, and the general principles defined herein can be implemented in other embodiments without departing from the spirit or scope of the present disclosure. Hence, the present disclosure will not be limited to these embodiments shown herein, but will conform to the widest scope consistent with the principles and novel features applied herein.

What is claimed is:

1. An acquisition method for domain rule knowledge of an industrial process, comprising:
   establishing a domain rule base, establishing a semantic knowledge base, and combining the domain rule base and the semantic knowledge base so as to realize an augmented update of a domain rule knowledge base;
   wherein steps of establishing the domain rule base comprise:
   performing representation and extraction of domain knowledge by describing domain knowledge of the industrial process by using weighted first-order logic rules so as to form a training sample set of the first-order logic rules; and
   performing construction of the domain rule base by performing a weight learning by applying probability soft logic and the training sample set of the first-order logic rules so as to realize weight to non-weighted rules;
   wherein steps of establishing the semantic knowledge base comprise: performing rule learning through a machine learning algorithm to obtain a first-order logic rule on a change in optimization decision-making semantics when multi-source data semantic information changes;
   wherein a specific form of the weighted first-order logic rules is that if an N-ary predicate P represents that a property, state, or attribute of a certain industrial process target D is $D_S$ under a condition of $C_1, \ldots, C_n$, $P(D, C_1, \ldots, C_n, D_s)$ is an atom;
   a relationship between a certain optimization decision-making problem and a series of causes of the optimization decision-making problem expressed by the weighted first-order logic rules is as follows:

$$\forall D_1, D_2, \ldots, D_l, R \cdot P_1(D_1, \ldots) \wedge P_2(D_2, \ldots) \wedge \ldots \wedge P_l(D_l, \ldots) \Rightarrow P_R(Q,R):\lambda,$$

and the relationship indicates that states of industrial process targets $D_1, D_2, \ldots D_l$ in a certain condition cause the optimization decision-making problem Q resulting in R;
   wherein $P_1, P_2, \ldots, P_l, P_R$ are predicates; $D_1, D_2, \ldots D_l$, R are variables; l represents a total number of predicate logical representations on the industrial process targets in one rule; and $\lambda$ represents a weight;
   a specific form of semantic knowledge is k=($H_1$, $H_2, \ldots, H_N$):{$A_1, A_2, \ldots, A_N$}: R, wherein a specific from of R is {$R_1, R_2, \ldots, R_N$}; $H_N$ is an n-th compact characteristic of an n-th multi-source data $X_N$; $A_i$ is semantic information of an n-th multi-source data $X_N$; in a case that different multi-source data corresponds to different semantic information changes, a variation law of the optimization decision-making semantics $R_N$ is implied; by mining a variation law between the semantic information and the optimization decision-making semantics of the different multi-source data from the semantic knowledge base, the first-order logic rule is extracted from the semantic information of the multi-source data;
   a specific step of performing the rule learning through the machine learning algorithm so as to obtain the first-order logic rule on the change in the optimization decision-making semantics when the multi-source data semantic information changes is:
   defining a logic predicate $P_i(H_i, c_{A_i}^{ij})$ to represent that characteristic semantics corresponding to an i-th compact characteristic $H_i$ of the multi-source data is $c_{A_i}^{ij}$ such that the first-order logic rule on the change in the optimization decision-making semantics when the multi-source data semantic information changes is obtained by performing the rule learning through the machine learning algorithm, and the first-order logic rule is represented by:

$$P_1(H_1, c_{A_1}^{ij}) \wedge \ldots \wedge P_N(H_N, c_{A_N}^{Nj}) \Rightarrow P_R(c_R^s):\hat{\lambda}$$

the first-order logic rule indicates that a result of the optimization decision-making problem after the compact characteristics $H_1, H_2, \ldots, H_N$ of the multi-source data being subject to the rule learning by using the machine learning algorithm is $c_R^s$,
   wherein $P_R(c_R^s)$ represents a logic predicate of the optimization decision-making semantics, and $\hat{\lambda}$ represents a corresponding weight.

2. The acquisition method for the domain rule knowledge of the industrial process of claim 1, wherein the weight of the first-order logic rule indicates an importance of the first-order logic rule, wherein the larger the weight of the first-order logic rule, the more important the first-order logic rule is, and a specific value of the weight is a non-negative real number.

3. The acquisition method for the domain rule knowledge of the industrial process of claim 1, wherein the domain rule knowledge base is defined as:

$$K_R = \{(r_i, \lambda_i)\}_{i=1}^m$$

wherein m represents a size of the domain rule knowledge base, $r_i$ represents an i-th first-order logic rule, and $\lambda_i$ is a corresponding weight of the i-th first-order logic rule.

4. The acquisition method for the domain rule knowledge of the industrial process of claim 3, wherein a model of the probability soft logic defines a probability distribution to enable as many atomic explanations to satisfy all of the first-order logic rules as possible, and the probability distribution thereof is as follows:

$$P(I) = \frac{1}{Z} \exp\left[-\sum_{r \in K_R} \lambda_r (d(r))^p\right]$$

$$Z = \int_I \exp\left[-\sum_{r \in K_R} \lambda_r (d(r))^p\right],$$

wherein $\lambda_r$ represents a weight value of a first-order logic rule r; Z is a planning factor for Markov Random Field; $P \in \{1,2\}$ represents that 2 types of loss functions are provided, and when P=1, a linear loss function, which means a size of a distance between satisfying one first-order logic rule and violating the one first-order logic rule, is adopted, and when P=2, a square loss function, which means that all rules are satisfied to some degree, is adopted; and d(r) represents a distance satisfaction of the first-order logic rule r.

5. The acquisition method for the domain rule knowledge of the industrial process of claim 4, wherein the probability soft logic defines the distance satisfaction to evaluate a probability of a logic rule being satisfied:

$$d(r)=\max\{0, I(r_{body})-I(r_{head})\}; \text{ and}$$

in the model of the probability soft logic, values of an atomic probability of the first-order logic rules adopt soft truth-values, which are continuous values between [0,1]; the first-order logic rule r is equivalently expressed as $r_{body} \rightarrow r_{head}$, wherein a rule body infers a rule head; $I(r_{body})$ is a probability of the rule body being established; and $I(r_{head})$ is a probability of the rule head being established.

6. The acquisition method for the domain rule knowledge of the industrial process of claim 5, wherein the weight learning is as follows: using the training sample set of the first-order logic rules and non-weighted first-order logic rules as inputs; and calculating a best weight for each of the rules by means of Maximum likelihood estimate; and a maximum likelihood function of the Maximum likelihood estimate is:

$$f(I; \lambda_{r_i}) = \prod_{i=1}^{n} \frac{1}{\int_I \exp\left[-\sum_{r_i \in K_R} \lambda_{r_i}(d(r_i))^P\right]} * \exp\left[-\sum_{r_i \in K_R} \lambda_{r_i}(d(r_i))^P\right],$$

and by solving the above equation, a maximum likelihood estimator of $\lambda_r$ is obtained, such that a probability density distribution P*(I) of a known first-order logic rule base is obtained as shown by the following equation:

$$P^*(I) = \frac{1}{Z}\exp\left[-\sum_{r \in K_R} \lambda_r(d(r))^P\right]$$

$$Z = \int_I \exp\left[-\sum_{r \in K_R} \lambda_r(d(r))^P\right],$$

and a weight of unknown first-order logic rule is obtained by means of the probability density distribution P*(I).

* * * * *